(12) United States Patent
Marberger et al.

(10) Patent No.: US 11,383,730 B2
(45) Date of Patent: Jul. 12, 2022

(54) METHOD AND DEVICE FOR ASSISTING A DRIVER DURING THE DEACTIVATION OF A HIGHLY AUTOMATED DRIVING MODE OF A VEHICLE

(71) Applicant: Robert Bosch GmbH, Stuttgart (DE)

(72) Inventors: Claus Marberger, Weil der Stadt (DE); Folko Flehmig, Stuttgart (DE); Johannes Foltin, Ditzingen (DE); Peter Sautter, Lauffen (DE); Sybille Eisele, Hessigheim (DE); Tjark Vandommele, Stuttgart (DE); Felix Wulf, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 16/337,705

(22) PCT Filed: Aug. 8, 2017

(86) PCT No.: PCT/EP2017/070083
§ 371 (c)(1),
(2) Date: Mar. 28, 2019

(87) PCT Pub. No.: WO2018/072911
PCT Pub. Date: Apr. 26, 2018

(65) Prior Publication Data
US 2020/0039535 A1   Feb. 6, 2020

(30) Foreign Application Priority Data

Oct. 20, 2016   (DE) .......................... 102016220549.8

(51) Int. Cl.
*G05D 1/00* (2006.01)
*B60W 40/08* (2012.01)
(Continued)

(52) U.S. Cl.
CPC ............ *B60W 50/14* (2013.01); *B60W 10/18* (2013.01); *B60W 30/08* (2013.01); *B60W 40/08* (2013.01);
(Continued)

(58) Field of Classification Search
CPC ........... B60W 2050/143; B60W 10/18; B60W 30/08; B60W 40/08; B60W 2040/0818;
(Continued)

(56) References Cited

U.S. PATENT DOCUMENTS

| 10,525,975 | B2* | 1/2020 | Krabot | ................ B60W 30/162 |
| 2014/0088814 | A1* | 3/2014 | You | ...................... G05D 1/0061 |
| | | | | 701/23 |

(Continued)

FOREIGN PATENT DOCUMENTS

| CN | 103732480 A | 4/2014 |
| CN | 104097642 A | 10/2014 |

(Continued)

OTHER PUBLICATIONS

English translation for DE-102014225680-A1.*

(Continued)

*Primary Examiner* — Elaine Gort
*Assistant Examiner* — Chanmin Park
(74) *Attorney, Agent, or Firm* — Norton Rose Fulbright US LLP; Gerard Messina

(57) ABSTRACT

A method for assisting a driver during the deactivation of a highly automated driving mode of a vehicle. In this context, a takeover signal, which represents a takeover of control of the vehicle by the driver, and auxiliary information are read in. The auxiliary information includes image information representing the driver and/or vehicle-control information representing a control of the vehicle by the driver. In a further step, a degree of attentiveness of the driver is (Continued)

determined, using the takeover signal and the auxiliary information. Finally, using the degree of attentiveness, an assistance signal is output to assist the driver during the takeover of control, by activating at least one driver-assistance function of the vehicle.

8 Claims, 3 Drawing Sheets

(51) Int. Cl.
*B60W 50/14* (2020.01)
*B60W 10/18* (2012.01)
*B60W 30/08* (2012.01)
*B60W 50/00* (2006.01)

(52) U.S. Cl.
CPC ... *G05D 1/0088* (2013.01); *B60W 2040/0818* (2013.01); *B60W 2050/0072* (2013.01); *B60W 2050/143* (2013.01); *B60W 2420/42* (2013.01); *B60W 2710/18* (2013.01); *G05D 2201/0213* (2013.01)

(58) Field of Classification Search
CPC ..... B60W 2050/0072; B60W 2420/42; B60W 2710/18; B60W 50/14; G05D 1/0088
See application file for complete search history.

(56) References Cited

U.S. PATENT DOCUMENTS

| 2015/0070160 | A1 | 3/2015 | Davidsson et al. |
| 2016/0167671 | A1* | 6/2016 | Offenhaeuser ........ B60W 40/08 701/41 |
| 2017/0205823 | A1* | 7/2017 | Arndt ..................... G05D 1/021 |
| 2019/0001992 | A1* | 1/2019 | Kwoczek ............... G08B 21/06 |
| 2019/0139509 | A1* | 5/2019 | Shin ................. G08G 1/096775 |

FOREIGN PATENT DOCUMENTS

| CN | 104973071 A | 10/2015 | |
| DE | 102012223758 A1 | 3/2014 | |
| DE | 102014225680 A1 * | 6/2016 | ............ B60W 50/14 |
| DE | 102014225680 A1 | 6/2016 | |
| EP | 2314489 A1 | 4/2011 | |
| EP | 2848488 A1 | 3/2015 | |
| EP | 3192695 A1 | 7/2017 | |
| WO | WO-2016009012 A1 * | 1/2016 | ............ G05D 1/0088 |

OTHER PUBLICATIONS

Englisth translation for WO-2016009012-A1.*
International Search Report for PCT/EP2017/070083, dated Nov. 9, 2017.

* cited by examiner

METHOD AND DEVICE FOR ASSISTING A DRIVER DURING THE DEACTIVATION OF A HIGHLY AUTOMATED DRIVING MODE OF A VEHICLE

BACKGROUND INFORMATION

The present invention is based on a device and a method. The subject matter of the present invention is also a computer program.

In the case of highly automated driving, at system limits, the control of the vehicle should be taken over again by the driver with a sufficient time reserve. For example, time periods between 4 and 10 seconds are regarded as sufficient. The degree of automation is thereby able to change from highly automated to manual. Likewise, the driver is also able to deactivate the automation without prompting, e.g., by switch, and thus change to the manual driving mode.

Driver-monitoring cameras detect a viewing direction of the driver, for instance, and are able to detect a state of drowsiness of the driver based on various eye parameters such as blinking of the eyelid or eye movements. In the event driver drowsiness is detected, a suitable system may indicate, for example, that the driver should take a break. The analysis of the viewing direction may be used for assessing the visual attentiveness, and therefore, for the output of warnings to the distracted driver.

SUMMARY

The present invention provides a method for assisting a driver during the deactivation of a highly automated driving mode of a vehicle, a device which uses this method, and finally a corresponding computer program. Advantageous further developments of and improvements to the device in accordance with the present invention are described herein.

An example method in accordance with the present invention for assisting a driver during the deactivation of a highly automated driving mode of a vehicle, the example method including the following steps:

Read-in of a takeover signal, which represents a takeover of control of the vehicle by the driver, and auxiliary information which includes image information representing the driver and/or vehicle-control information representing a control of the vehicle by the driver;

Determination of a degree of attentiveness of the driver, using the takeover signal and the auxiliary information; and Output of an assistance signal using the degree of attentiveness in order to assist the driver during the takeover of the control, by activating at least one driver-assistance function of the vehicle.

A vehicle may be understood to be a motor vehicle like, e.g., an automobile or truck. In particular, the vehicle may be a highly automated vehicle which is able to drive independently without intervention by a driver. Accordingly, a highly automated driving mode may be understood to be an operating mode of the vehicle, in which the vehicle is controlled automatically without intervention by the driver. For instance, the takeover signal may be generated when the driver touches or operates a steering wheel, a brake pedal or gas pedal or other control element of the vehicle. The image information may be information generated using a driver-observation device of the vehicle, for instance, an interior camera. Depending on the specific embodiment, the image information may be made available continuously or in response to the takeover of control by the driver. The vehicle-control information may be information which is attained by evaluating the uniformity of steering-wheel motions, absolutely and/or relative to the traffic lane and its marking. In addition or alternatively, the vehicle-control information may be ascertained from a regularity in the longitudinal driving behavior such as braking, accelerations and maintenance of a speed, absolutely and/or in relation to other road users. For instance, the vehicle-control information may also represent the quickness with which the driver assumes control. If the vehicle-control information for a specific situation represents a takeover that is too fast, that is, a takeover whose duration drops below a predetermined minimum takeover duration, a takeover situation in need of assistance may then be inferred, for example.

In principle, the degree of attentiveness may also be provided independently of the driver monitoring, for instance, if no camera is present or the images acquired do not meet the necessary criteria, perhaps because the camera is blind or scratched or the driver is wearing sunglasses. It would then be possible to use a handover phase of maximum duration, which is terminated as soon as quality criteria of the manual vehicle control are adhered to.

A degree of attentiveness may be understood to be a measure for a situational awareness of the driver with respect to an instantaneous driving situation. For instance, the degree of attentiveness may be characterized by a viewing behavior, that is, by the manner in which the driver obtains visual assurance. The assistance signal may be output, for example, to assist the driver in the takeover of the control during a transition phase of limited duration, by suitable activation of the driver-assistance function. A driver-assistance function may be understood to be a function of the vehicle, by which the driver is assisted automatically in the guidance of the vehicle. For instance, the driver-assistance function may be a lane-keeping function, an automatic braking function or a lane-change function.

The approach presented here is based on the recognition that when taking over manual control of a highly automated vehicle, a driver is able to be assisted temporarily by certain driver-assistance functions. For example, a suitable driver hand-over strategy may be adapted to the characteristics of the driver. Thus, during the takeover of the driving task, specifically supportive assistance systems may be made available to the driver during an assistance phase depending, for example, on a situational awareness of the driver and a quality of the manual vehicle guidance.

As soon as the driver deactivates a highly automated driving mode, e.g., after a takeover prompt, he has full control over the vehicle and is completely responsible for the safety of the vehicle guidance. In this context, especially after longer periods of highly automated driving and in the case of rapid takeover reactions by the driver, a comparatively unsafe driving phase may come about, since possibly the awareness of the instantaneous driving situation and the risk of certain driving maneuvers is not yet sufficiently developed. The approach presented here now provides an assisted handover, which may be adapted in manner, intensity and duration according to the condition and performance of the driver in such a way that the safety risk when changing to a manual driving mode may be reduced considerably.

According to one specific embodiment of the present invention, in the determination step, a viewing behavior of the driver may be analyzed using the image information, in order to determine the degree of attentiveness. A viewing behavior may be understood to be the manner in which the driver visually secures areas around the vehicle. For example, the viewing behavior may be characterized by a viewing direction of the driver, a period of time during which the viewing direction is maintained, or a speed of a change between different viewing directions. This permits reliable determination of the degree of attentiveness.

According to a further specific embodiment of the present invention, in the read-in step, driving-situation information representing a driving situation of the vehicle may be read in, the viewing behavior being able to be evaluated in the determination step using the driving-situation information, in order to determine the degree of attentiveness. For instance, the driving situation may be understood to be a situation of the vehicle characterized by traffic conditions, a type of road traveled by the vehicle, a number of other road users, a speed of the vehicle or a signposting. Driving-situation information may be understood to be information provided by a driving-environment sensor of the vehicle, for example, or by a digital map. This specific embodiment makes it possible to determine the degree of attentiveness, taking into account the driving situation of the vehicle.

In addition, in the output step, the assistance signal may be output in order to activate a collision-warning function, an automatic braking function, a lane-change warning function or a lane-keeping function of the vehicle or a combination of at least two of the indicated assistance functions, if the degree of attentiveness represents a viewing direction of the driver that is turned away from a front, side and/or rear area of the vehicle. Collisions of the vehicle with adjacent vehicles may thereby be prevented.

For instance, in the output step, the assistance signal may be output in order to activate the lane-change warning function and/or the lane-keeping function if the degree of attentiveness represents a viewing direction of the driver that is turned away from the side and/or rear area of the vehicle. Dangerous lane changes and/or unintentional drifting out of the lane may thereby be prevented.

According to a further specific embodiment of the present invention, in an analyzing step, using the takeover signal, a steering behavior of the vehicle or, additionally or alternatively, an acceleration behavior of the vehicle may be analyzed in order to obtain a quality value with respect to the control of the vehicle by the driver. Correspondingly, in the output step, the assistance signal may be output using the quality value. It is thereby possible to efficiently counteract errors in the manual control of the vehicle.

In this context, in the output step, the assistance signal may be output in order to trigger a lane-keeping function of the vehicle, if the quality value represents a variation of a lane position of the vehicle outside of a predetermined tolerance range. A tolerance range may be understood to be a range between two limiting values, within which a variation of the lane position is classified as non-critical. This specific embodiment makes it possible to keep the vehicle stably in its lane during the change to the manual driving mode.

For example, this method may be implemented in software or hardware or in a mixed form of software and hardware, e.g., in a control unit.

The present invention provides an example device which is designed to carry out, control or implement the steps of a variant of a method presented here, in suitable units. The object of the present invention may be achieved quickly and efficiently by this embodiment variant of the present invention in the form of a device, as well.

To that end, the example device may have at least one arithmetic logic unit for the processing of signals or data, at least one memory unit for storing signals or data, at least one interface to a sensor or an actuator for reading in sensor signals from the sensor or for the output of data signals or control signals to the actuator and/or at least one communication interface for the read-in or output of data which are embedded into a communication protocol. The arithmetic logic unit may be a signal processor, a microcontroller or the like, for example, while the memory unit may be a flash memory, an EPROM or a magnetic memory unit. The communication interface may be adapted to read in or output data in wireless and/or conducted fashion, a communication interface which is able to read in or output conducted data having the capability to read in this data electrically or optically from a corresponding data-transmission line, for example, or output it into a corresponding data-transmission line.

In the present case, a device may be understood to be an electrical device which processes sensor signals and outputs control signals and/or data signals as a function thereof. The device may have an interface which may be implemented in hardware and/or software. If implemented in hardware, the interfaces may be part of what is referred to as a system ASIC, for example, that includes a wide variety of functions of the device. However, it is also possible that the interfaces are separate integrated circuits or are made up at least partially of discrete components. If implemented in software, the interfaces may be software modules which are present on a microcontroller, for example, in addition to other software modules.

In one advantageous development of the present invention, the vehicle is controlled by way of the device. To that end, for example, the device is able to access sensor signals such as acceleration signals, pressure signals, steering-angle signals, vehicle-interior signals or driving-environment sensor signals. The control is carried out via actuators such as braking or steering actuators or an engine control unit of the vehicle.

Of advantage is also a computer-program product or computer program having program code that may be stored on a machine-readable carrier or storage medium such as a semiconductor memory, a hard disk memory or an optical memory and is used to carry out, implement and/or control the steps of the method according to one of the specific embodiments of the present invention described above, especially when the program product or program is executed on a computer or a device.

Exemplary embodiments of the present invention are represented in the figures and explained in greater detail below.

DETAILED DESCRIPTION OF EXAMPLE EMBODIMENTS

Figure 1:
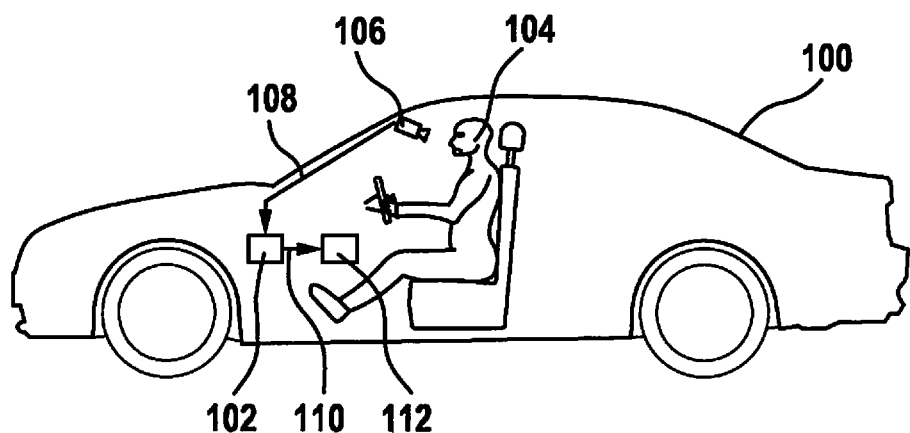
FIG. 1 shows a schematic representation of a vehicle having a device according to one exemplary embodiment.

In the description below of advantageous exemplary embodiments of the present invention, the same or similar reference numerals are used for the similarly functioning elements shown in the various figures, a description of these elements not being repeated.

FIG. 1 shows a schematic representation of a vehicle 100 having a device 102 according to one exemplary embodiment. Vehicle 100 is a vehicle controllable both in automated fashion and manually. FIG. 1 shows vehicle 100 during the change from a highly automated driving mode in which vehicle 100 is controlled automatically, to a manual driving mode in which vehicle 100 is controlled by a driver 104. In the process, using image information 108 made available by a driver-observation device 106, here an interior camera, device 102 determines a degree of attentiveness of driver 104. For example, the degree of attentiveness is determined as a function of a viewing behavior of driver 104 represented by image information 108. Depending on the degree of attentiveness, device 102 outputs an assistance signal 110 which is used to activate at least one function of a driver-assistance system 112 of vehicle 100 in order to stabilize the driving behavior, for instance. In this manner, accidents may be avoided during the change to the manual driving mode.

Figure 2:
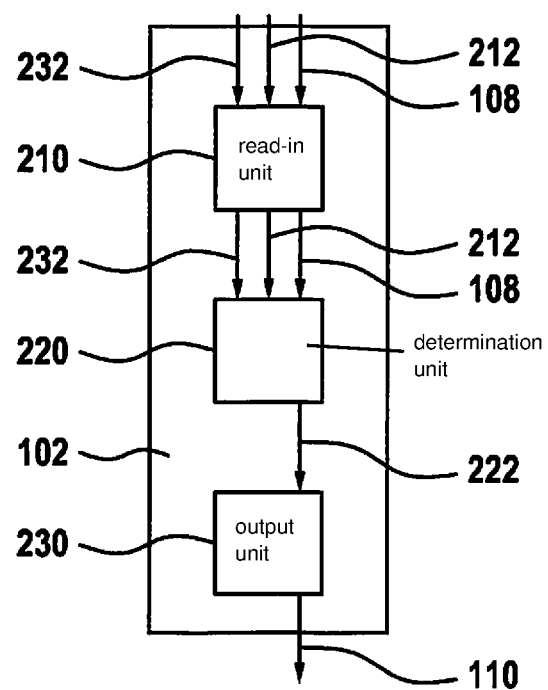
FIG. 2 shows a schematic representation of a device according to one exemplary embodiment.

FIG. 2 shows a schematic representation of a device 102 according to one exemplary embodiment, for instance, a device described above with the aid of FIG. 1. Device 102 includes a read-in unit 210 for reading in a takeover signal 212 that represents the takeover of the control by the driver. In addition, read-in unit 210 is adapted to read in image information 108 from the driver-observation device. Read-in unit 210 transmits takeover signal 212 and image information 108 to a determination unit 220 which is designed, in response to receiving takeover signal 212, to determine the degree of attentiveness of the driver using image information 108, and to pass on an attentiveness signal 222 representing the degree of attentiveness to an output unit 230 of device 102. Output unit 230 is designed, using attentiveness signal 222, to output assistance signal 110.

According to one exemplary embodiment, determination unit 220 determines the degree of attentiveness based on an analysis of a viewing behavior of the driver, using image information 108. In this connection, it is advantageous if read-in unit 210 reads in optional driving-situation information 232 with regard to an instantaneous driving situation, and passes it on to determination unit 220. For example, driving-situation information 232 is used by determination unit 220 to evaluate the viewing behavior in light of the driving situation represented by driving-situation information 232, in order to determine the degree of attentiveness.

Figure 3:
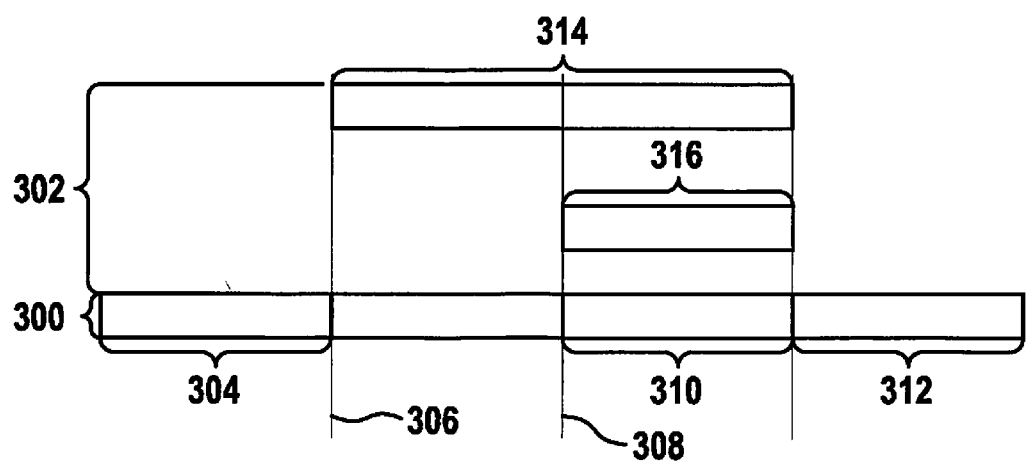
FIG. 3 shows a schematic representation of a functional sequence of an assisted takeover, using a device according to one exemplary embodiment.

FIG. 3 shows a schematic representation of a functional sequence of an assisted takeover employing a device according to one exemplary embodiment, for instance, a device as described above with reference to FIGS. 1 and 2. Shown are a system status 300 as well as a monitoring status 302 of a driver monitoring. At the beginning of the sequence, upon detecting a system limit, a highly automated system 304 of the vehicle outputs a takeover prompt to the driver at a prompting instant 306. At the same time, the high automation is maintained to the greatest extent possible for a certain time reserve. After the takeover by the driver at a takeover instant 308, depending on the evaluation of the driver behavior, the system changes to a transition phase 310 with manual controllability and specifically switched-in assistance functions. Transition phase 310 finally leads to the target state of "manual driving," denoted by a block 312.

Starting from prompting instant 306, a situational awareness of the driver is monitored, denoted by a block 314. As of takeover instant 308, a driver performance is monitored based, for instance, on a steering behavior or acceleration behavior of the vehicle. The monitoring of the driver performance is indicated by a block 316. Both the monitoring of the situational awareness and the monitoring of the driver performance are terminated, for example, at the end of transition phase 310.

Figure 4:
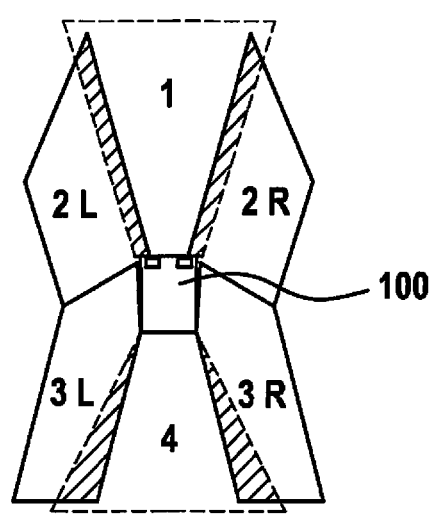
FIG. 4 shows a schematic representation of monitoring areas around a vehicle from FIG. 1.

FIG. 4 shows a schematic representation of monitoring areas around a vehicle 100 from FIG. 1. Vehicle 100 is shown in a top view. Shown are a front area 1, a left front side area 2L, a right front side area 2R, a left rear side area 3L, a right rear side area 3R as well as a rear area 4. For example, the monitoring areas are areas around the vehicle which the driver should secure visually during the takeover of the control.

Figure 5:
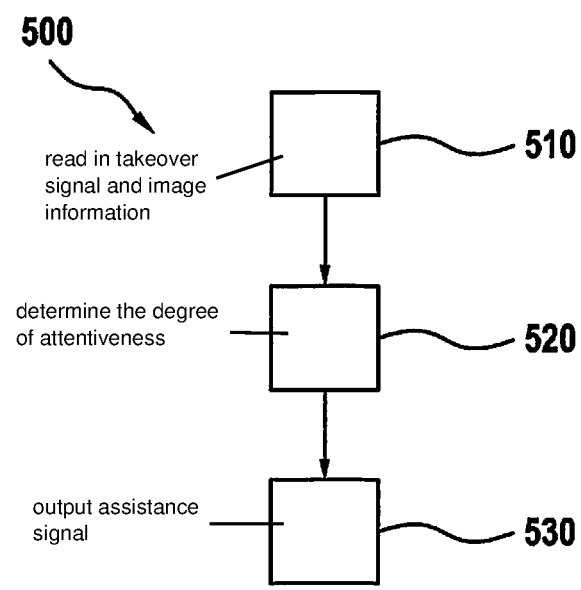
FIG. 5 shows a flowchart of a method according to one exemplary embodiment.

FIG. 5 shows a flowchart of a method 500 according to one exemplary embodiment. For instance, method 500 may be carried out in conjunction with a device described above with reference to FIGS. 1 through 4. In this context, in a step 510, the takeover signal and the image information are read in. In a step 520, the degree of attentiveness is determined, using the takeover signal and the image information. In a step 530, using the degree of attentiveness, the assistance signal is output for assisting the driver, by activating at least one driver-assistance function of the vehicle.

In the following, various exemplary embodiments of the approach presented here on the basis of FIGS. 1 through 5 are described again in another way.

According to one exemplary embodiment, after a takeover prompt, driver-observation device 106, always active in the case of high automation, analyzes the viewing behavior of driver 104 in order to draw conclusions from it about his/her situational awareness for the instantaneous driving situation. The requirements for the viewing behavior are deduced, for example, from the type of takeover situation. Thus, for example, in the case of a takeover in non-critical driving situations, it is sufficient if only a front roadway area of vehicle 100 is covered visually by the driver, while in the case of a necessary braking or lane-change maneuver, a side and rear area should also be secured. Next, the instantaneous viewing behavior is evaluated relative to the demands of the driving situation. FIG. 3 shows, by way of example, an underlying functional sequence of a control takeover in the sense of the approach presented here.

As soon as the driver deactivates the high automation using one of the available mechanisms, and therefore assumes control of the vehicle, the system state changes to a transition mode in which on one hand, it is possible to control the vehicle completely manually, and on the other hand, available assistance and safety systems of vehicle 100 are switched in according to the requirement. The type and intensity of the systems now activated depend on the estimated situational awareness, that is, the degree of attentiveness of driver 104 determined based on the viewing direction, as well as on the evaluation of the manual driver performance.

For example, if control of the vehicle is taken over without driver 104 having sufficiently secured the forward area, also known as front area, then according to one exemplary embodiment, systems for maintaining a safe distance, for instance, collision-warning systems or automatic braking systems, are activated in an especially sensitive parameterization.

If, in the case of a possibly necessary lane change, perhaps because of an obstacle on the roadway, it is determined that the driver is not adequately securing the area to the side or to the rear, then according to a further exemplary embodiment, lane-change warning systems and/or lane-keeping assistance systems are activated in an especially sensitive parameterization.

If, after control has been taken over without the requirement for critical maneuvering, an overly sharp variation of a lane position is determined, for instance moving to and fro within a traffic lane or, e.g., slow drifting out of the lane or a departure from the lane, then according to a further exemplary embodiment, systems for improving a lane-keeping quality, perhaps in the form of a lane-center guidance assistance or a lane-departure warning, are activated in an especially sensitive parameterization.

If the driver takes over control considerably too rapidly according to customary takeover times, without visual securing, then it may be assumed that in general, the situational awareness is at a low level. In this case, for example, all available safety systems are activated in an especially sensitive parameterization.

For example, the situational awareness for various areas around the vehicle is modeled as decay function of the situational knowledge. It is assumed that knowledge about a spatially defined area is increased and maintained by turning one's eyes toward it and decreases continuously upon turning away from it. When turning one's eyes toward it again, the knowledge in turn increases. Possible output values of the knowledge model are percentage values between 0 and 100 percent and pertain, e.g., to the monitoring areas around vehicle 100 shown in FIG. 4.

For example, the duration of assisted transition phase 310 is a function of the assessment of the situational awareness and the quality of the manual vehicle control, respectively. If the situational awareness or visual safeguarding behavior of driver 104 is sufficient, transition phase 310 is ended, for instance, after a minimum duration to be specified. Alternatively, transition phase 310 is ended as soon as certain quality criteria of the manual vehicle control, perhaps an average yaw-angle error, correspond to an individual standard measure.

Alternatively, transition phase 310 is determined independently of the driver monitoring, with a maximum duration of, e.g., 30 seconds. So long as it is active, the assisted safety mode is communicated to the driver via a suitable visual symbol, for example. After transition phase 310, the system changes to the manual driving mode in which the assistance systems normally desired by driver 104 are possibly active.

In a further exemplary embodiment of the present invention, the duration of the handover is adjusted solely on the basis of the vehicle-control information, such as certain quality criteria of the manual vehicle control. In this case, it is possible to dispense with the image information of the driver, which makes the system particularly advantageous and trouble-free. For example, this specific embodiment may be used when the image information of the driver is missing or quality criteria of the image information are not sufficiently good. This may be, for instance, if the lens of the camera is dirty, if the condition of the driver can no longer be detected accurately owing to obscurations and/or if, e.g., the supply voltage of the driver-monitoring camera has failed, whereby a driver-takeover prompt may also be triggered. In this case, it is expedient to adapt the method solely on the basis of the ability of the driver to control the vehicle, as well as optionally on the basis of driving-environment-sensor information.

According to a further exemplary embodiment of the present invention, the functional sequence described above is also employed in the case of a driver-triggered takeover without a preceding takeover prompt.

If an exemplary embodiment includes an "and/or" link between a first feature and a second feature, this is to be read in such a way that the exemplary embodiment according to one specific embodiment has both the first feature and the second feature, and according to a further specific embodiment, has either only the first feature or only the second feature.

What is claimed is:

1. A method for assisting a driver during deactivation of a highly automated driving mode of a vehicle, the method comprising:
   reading in:
      a takeover signal which represents a switchover to be performed from the highly automated driving mode to a manual mode in which the driver performs a manual control of the vehicle; and
      auxiliary information which includes:
         (i) an identification of an environment of the vehicle; and
         (ii)(a) image information representing the driver and/or (b) vehicle-control information representing a control of the vehicle by the driver;
   in a period that is after the reading in of the takeover signal and prior to a beginning of the switchover from the highly automated driving mode to the manual mode, determining a degree of attentiveness of the driver using the auxiliary information;
   determining a respective target degree of attentiveness for each of a plurality of respective directions according to the identified environment, wherein the determined degree of attentiveness includes a respective determined degree of attentiveness for each of the plurality of directions;
   selecting one or more of driver-assistance functions to initially supplement the manual control by the driver, wherein the selecting is performed depending on a respective determination for each of the plurality of directions of a consistency of the respective determined degree of attentiveness with the respective target degree of attentiveness of the respective direction; and
   in accordance with the selection, outputting an assistance signal to activate one or more driver-assistance functions to initially supplement the manual control after the switchover has begun.

2. The method as recited in claim 1, wherein in the determining of the degree of attentiveness of the driver using the auxiliary information, a viewing behavior of the driver is analyzed using the image information to determine the degree of attentiveness.

3. The method as recited in claim 2, wherein in the reading in step, driving-situation information representing a driving situation of the vehicle is read in, the analysis of the viewing behavior being performed using the driving-situation information.

4. The method as recited in claim 2, wherein the assistance signal activates: (i) a collision-warning function, and/or (ii) an automatic braking function, and/or (iii) a lane-change warning function, and/or (iv) a lane-keeping function of the vehicle, according to a determination, based on the auxiliary information, that a viewing direction of the driver is turned away from a front and/or side and/or rear area of the vehicle.

5. The method as recited in claim 1, further comprising:
   after the switchover has begun and during the manual control, analyzing a steering behavior of the vehicle and/or acceleration behavior of the vehicle in order to obtain a quality value with respect to control of the vehicle by the driver; and modifying a control by the driver-assistance functions based on the quality value.

6. The method as recited in claim 5, wherein the modifying includes activating a lane-keeping function of the vehicle in response to the quality value representing a variation of a lane position of the vehicle outside of a predetermined tolerance range.

7. A device having units for assisting a driver during the deactivation of a highly automated driving mode of a vehicle, the units configured to:

read in:
   a takeover signal which represents a switchover to be performed from the highly automated driving mode to a manual mode in which the driver performs a manual control of the vehicle; and
   auxiliary information which includes:
     (i) an identification of an environment of the vehicle; and
     (ii)(a) image information representing the driver and/or (b) vehicle-control information representing a control of the vehicle by the driver;

in a period that is after the reading in of the takeover signal and prior to a beginning of the switchover from the highly automated driving mode to the manual mode, determine a degree of attentiveness of the driver using the auxiliary information;

determine a respective target degree of attentiveness for each of a plurality of respective directions according to the identified environment, wherein the determined degree of attentiveness includes a respective determined degree of attentiveness for each of the plurality of directions;

select one or more of driver-assistance functions to initially supplement the manual control by the driver, wherein the selection is performed depending on a respective determination for each of the plurality of directions of a consistency of the respective determined degree of attentiveness with the respective target degree of attentiveness of the respective direction; and in accordance with the selection, output an assistance signal to activate one or more driver-assistance functions to initially supplement the manual control after the switchover has begun.

8. A non-transitory machine-readable storage medium on which is stored a computer program for assisting a driver during the deactivation of a highly automated driving mode of a vehicle, the computer program, when executed by a computer, causing the computer to perform a method, the method comprising:

reading in:
   a takeover signal which represents a switchover to be performed from the highly automated driving mode to a manual mode in which the driver performs a manual control of the vehicle; and
   auxiliary information which includes:
     (i) an identification of an environment of the vehicle; and
     (ii)(a) image information representing the driver and/or (ii) (b) vehicle-control information representing a control of the vehicle by the driver;

in a period that is after the reading in of the takeover signal and prior to a beginning of the switchover from the highly automated driving mode to the manual mode, determining a degree of attentiveness of the driver using the auxiliary information;

determining a respective target degree of attentiveness for each of a plurality of respective directions according to the identified environment, wherein the determined degree of attentiveness includes a respective determined degree of attentiveness for each of the plurality of directions;

selecting one or more of driver-assistance functions to initially supplement the manual control by the driver, wherein the selection is performed depending on a respective determination for each of the plurality of directions of a consistency of the respective determined degree of attentiveness with the respective target degree of attentiveness of the respective direction; and in accordance with the selection, outputting an assistance signal to activate one or more driver-assistance functions to initially supplement the manual control after the switchover has begun.

* * * * *